US012392457B1

(12) United States Patent
Wang

(10) Patent No.: US 12,392,457 B1
(45) Date of Patent: Aug. 19, 2025

(54) LAMP BULB AND DECORATIVE LIGHT STRING

(71) Applicant: Hunan Zhida Technology Co., Ltd., Chenzhou (CN)

(72) Inventor: Xiangyong Wang, Hunan (CN)

(73) Assignee: Hunan Zhida Technology Co., Ltd., Chenzhou (CN)

( * ) Notice: Subject to any disclaimer, the term of this patent is extended or adjusted under 35 U.S.C. 154(b) by 0 days.

(21) Appl. No.: 18/820,503

(22) Filed: Aug. 30, 2024

(30) Foreign Application Priority Data

May 29, 2024 (CN) ......................... 202421200955.7

(51) Int. Cl.
*F21K 9/232* (2016.01)
*F21K 9/237* (2016.01)
*F21S 4/10* (2016.01)
*F21Y 115/10* (2016.01)

(52) U.S. Cl.
CPC .............. *F21K 9/232* (2016.08); *F21K 9/237* (2016.08); *F21S 4/10* (2016.01); *F21Y 2115/10* (2016.08)

(58) Field of Classification Search
CPC ........... F21K 9/232; F21S 4/10; F21V 23/001
See application file for complete search history.

(56) References Cited

U.S. PATENT DOCUMENTS 12,129,994 B1 * 10/2024 Yang ..................... F21V 23/001

* cited by examiner

*Primary Examiner* — Thomas M Sember
(74) *Attorney, Agent, or Firm* — AVEK IP, LLC

(57) ABSTRACT

Disclosed are a lamp bulb and a decorative light string. The lamp bulb includes a lamp housing, the lamp housing being a glass lamp housing; a light-emitting component arranged in the lamp housing and including a first light-emitting member and a second light-emitting member, the first light-emitting member being connected to the second light-emitting member in parallel, the first light-emitting member including a first positive electrode terminal and a first negative electrode terminal, the second light-emitting member including a second positive electrode terminal and a second negative electrode terminal, the first positive electrode terminal being electrically connected to the second negative electrode terminal, and the first negative electrode terminal being electrically connected to the second positive electrode terminal; and a conducting wire, where a part of the conducting wire being arranged in the lamp housing and hermetically connected to the lamp housing.

6 Claims, 2 Drawing Sheets

LAMP BULB AND DECORATIVE LIGHT STRING

CROSS REFERENCE TO RELATED APPLICATION

This application claims benefit of co-pending Chinese application No. 2024212009557, filed May 29, 2024, entitled LAMP BULB AND DECORATIVE LIGHT STRING. The contents of this application are incorporated herein by reference in its entirety.

TECHNICAL FIELD

The present disclosure relates to the technical field of lighting, and particularly to a lamp bulb and a decorative light string.

BACKGROUND

After Christmas lamps are exposed to rain, water droplets will adhere to electrodes of copper wires of lamp bulbs, and when the lamp bulbs are powered on for a long time, the electrodes will have oxidation and reduction reactions with water, resulting in wire electrolysis, the wires are easily broken, and the service life of the lamp bulbs is affected.

SUMMARY

The present disclosure aims to solve at least one of the technical problems in the existing technology. Therefore, the present disclosure provides a lamp bulb and a decorative light string, which can reduce the risk of wire electrolysis and prolong the service life.

In a first aspect of the present disclosure, an embodiment provides a lamp bulb, the lamp bulb includes a lamp housing, where the lamp housing is a glass lamp housing; a light-emitting component arranged in the lamp housing and including a first light-emitting member and a second light-emitting member, where the first light-emitting member is connected to the second light-emitting member in parallel, the first light-emitting member including a first positive electrode terminal and a first negative electrode terminal, the second light-emitting member includes a second positive electrode terminal and a second negative electrode terminal, the first positive electrode terminal is electrically connected to the second negative electrode terminal, and the first negative electrode terminal is electrically connected to the second positive electrode terminal; and a conducting wire, where a part of the conducting wire is arranged in the lamp housing and hermetically connected to the lamp housing, the first light-emitting member and the second light-emitting member are both fixed on the conducting wire, and the first light-emitting member and the second light-emitting member are both electrically connected to the conducting wire.

The lamp bulb according to the embodiment in the first aspect of the present disclosure has at least the following beneficial effects: the first positive electrode terminal is electrically connected to the second negative electrode terminal, the first negative electrode terminal is electrically connected to the second positive electrode terminal, and in the case of powering on, an oxidation reaction and a reduction reaction are carried out on the conducting wire in a crossed manner, which avoids that the conducting wire only has the oxidation reaction after being powered on, thereby reducing the loss of the conducting wire caused by the long-term oxidation reaction, preventing the conducting wire from being broken, and improving the service life of the lamp bulb.

According to some embodiments of the present disclosure, the conducting wire includes an internal wire and an external wire, the internal wire is electrically connected to the external wire, the internal wire is arranged inside the lamp housing and hermetically connected to the lamp housing, and the external wire is arranged outside the lamp housing.

According to some embodiments of the present disclosure, the internal wire includes a first internal wire and a second internal wire, and the first internal wire, the first light-emitting member, the second internal wire and the second light-emitting member are electrically connected in sequence.

According to some embodiments of the present disclosure, the first internal wire is bent, resulting in that the first light-emitting member emits light obliquely upwards.

According to some embodiments of the present disclosure, the second internal wire is bent, resulting in that the second light-emitting member emits light obliquely upwards.

According to some embodiments of the present disclosure, the conducting wire is made of Dumet wire.

According to some embodiments of the present disclosure, the first light-emitting member and the second light-emitting member are both Surface Mounted Devices (SMD) LED.

According to some embodiments of the present disclosure, the lamp housing is columnar.

According to some embodiments of the present disclosure, outer surfaces of the first light-emitting member and the second light-emitting member are both wrapped with protective glue.

In a second aspect of the present disclosure, an embodiment provides a decorative light string, the decorative light string includes the lamp bulb according to the embodiment in the first aspect of the present disclosure.

The decorative light string according to the embodiment in the second aspect of the present disclosure has at least the following beneficial effects: the first positive electrode terminal is electrically connected to the second negative electrode terminal, the first negative electrode terminal is electrically connected to the second positive electrode terminal, and in the case of powering on, an oxidation reaction and a reduction reaction are carried out on the conducting wire in a crossed manner, which avoids that the conducting wire only has the oxidation reaction after being powered on, thereby reducing the loss of the conducting wire caused by the long-term oxidation reaction, preventing the conducting wire from being broken, and improving the service life of the lamp bulb.

The additional aspects and advantages of the present disclosure will be partially provided in the following description, or will partially be apparent in the following description, or learned by practice of the present disclosure.

BRIEF DESCRIPTION OF THE DRAWINGS

The above and/or additional aspects and advantages of the present disclosure will be apparent and easily understood from the descriptions of embodiments with reference to the following drawings, wherein.

DESCRIPTION OF REFERENCE NUMERALS

Figure 1:
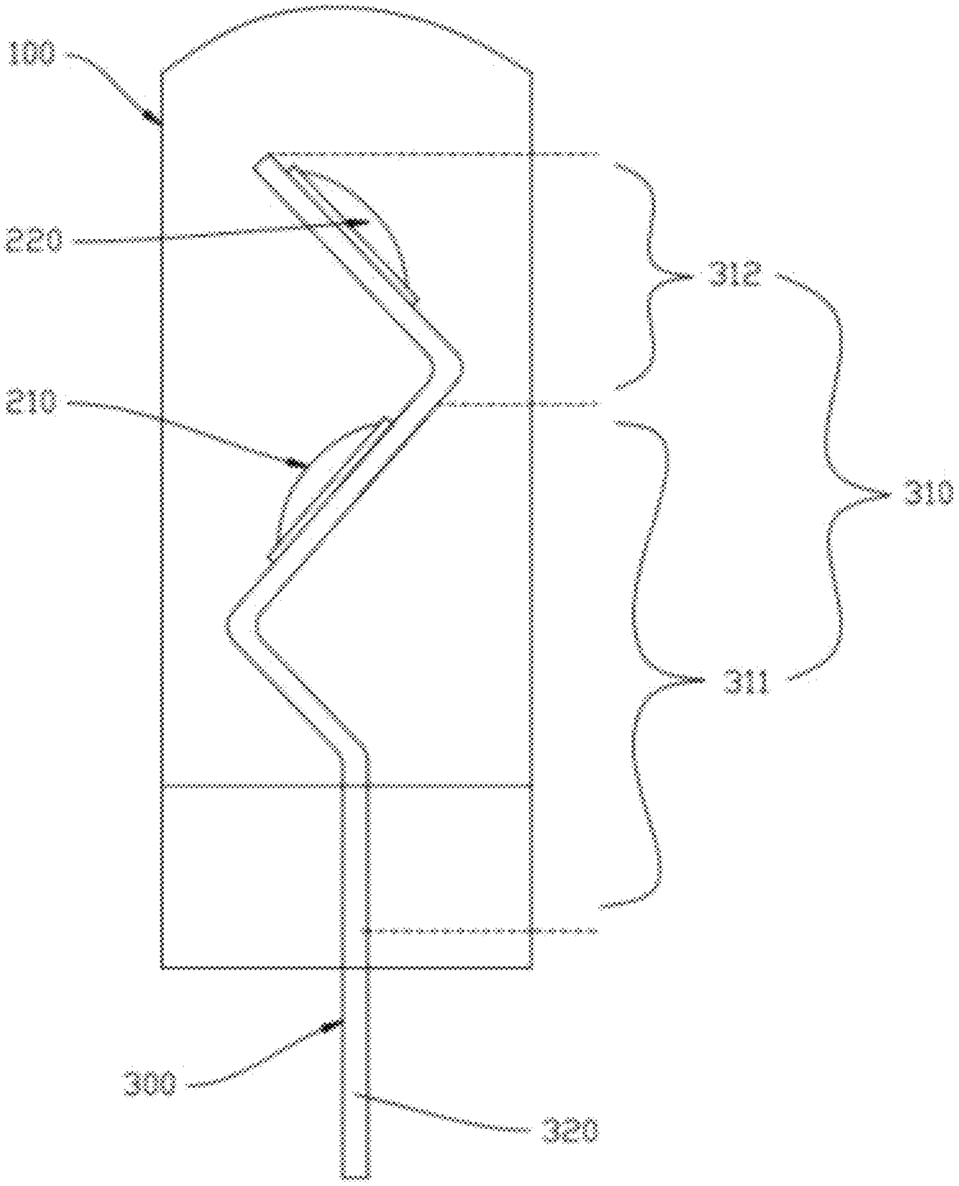
FIG. 1 is a right view of a lamp bulb according to an embodiment in a first aspect of the present disclosure.

100 refers to lamp bulb;

210 refers to first light-emitting member, and 220 refers to second light-emitting member; and

300 refers to conducting wire, 310 refers to internal wire, 311 refers to first internal wire, 312 refers to second internal wire, and 320 refers to external wire.

DETAILED DESCRIPTION

Embodiments of the present disclosure are described in detail hereinafter, and examples of the embodiments are shown in the drawings, where the same or similar reference numerals throughout the drawings denote the same or similar elements or elements having the same or similar functions. The embodiments described hereinafter with reference to the drawings are exemplary, and are only used to explain the present disclosure, but should not be understood as limiting the present disclosure.

In the description of the present disclosure, it should be understood that the orientations or positional relationships indicated by the terms such as “upper”, “lower”, “front”, “rear”, “left”, “right” and the like, refer to the orientations or positional relationships shown in the drawings, which are only intended to facilitate describing the present disclosure and simplifying the description, and do not indicate or imply that the indicated devices or elements must have a specific orientation, be constructed and operated in a specific orientation, and therefore cannot be understood as a limitation of the present disclosure.

In the description of the present disclosure, “several” refers to being one or more, “multiple” refers to being more than two, and “greater than”, “less than”, “more than”, and the like are understood as not including this number, while “above”, “below”, “within”, and the like are understood as including this number. If there is the description of first and second, it is only for the purpose of distinguishing technical features, and should not be understood as indicating or implying relative importance, implicitly indicating the number of the indicated technical features or implicitly indicating the order of the indicated technical features.

In the description of the present disclosure, the terms “arrangement”, “installation”, “connection”, and the like should be understood in broad sense unless otherwise specified and defined. The specific meaning of the above terms in the present disclosure can be reasonably determined according to specific contents of the technical solutions by those skilled in the art.

Figure 2:
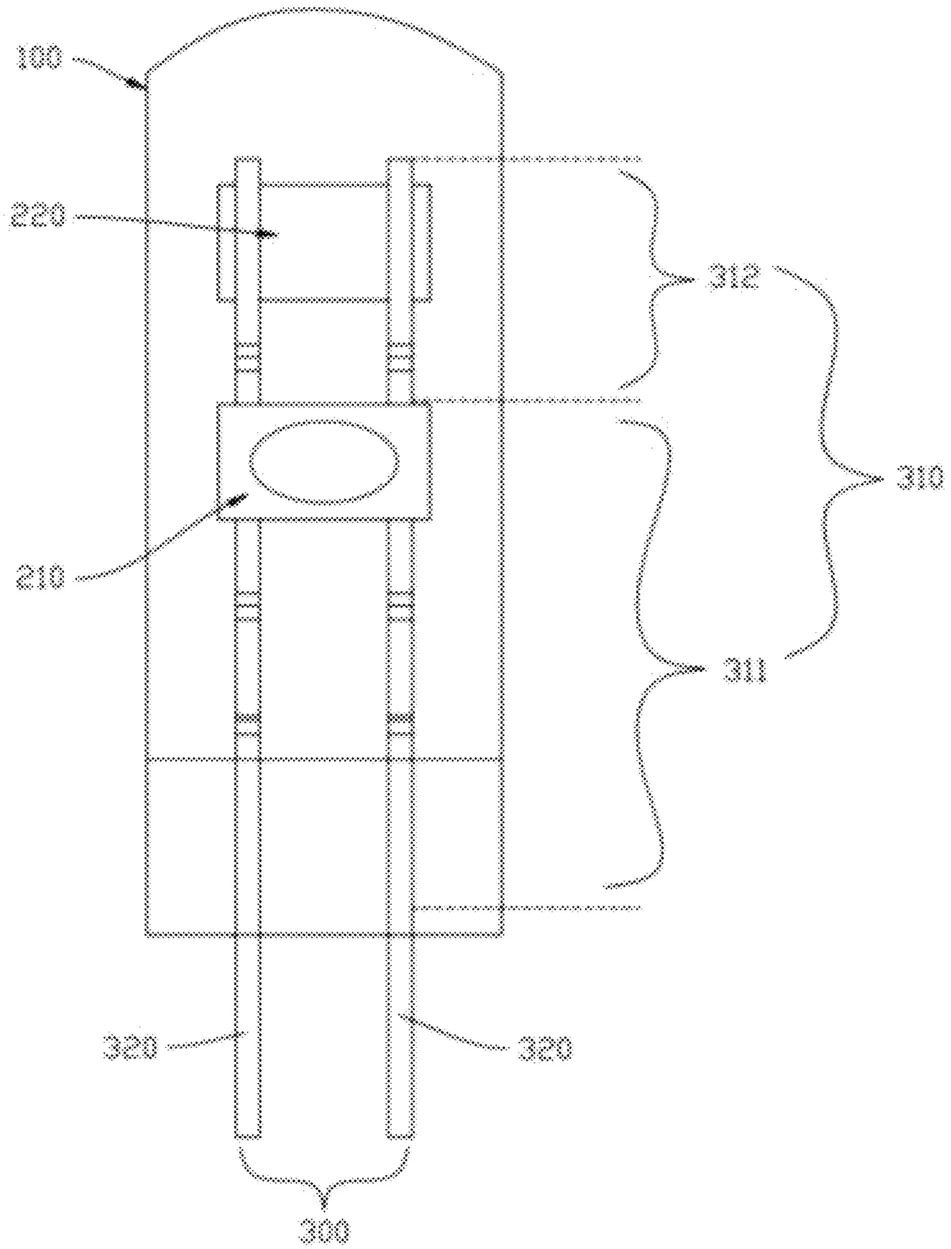
FIG. 2 is a front view of the lamp bulb according to the embodiment in the first aspect of the present disclosure.

With reference to FIG. 1 and FIG. 2, a lamp bulb according to an embodiment in a first aspect of the present disclosure includes a lamp housing 100, where the lamp housing 100 is a glass lamp housing 100; a light-emitting component arranged in the lamp housing 100 and including a first light-emitting member 210 and a second light-emitting member 220, where the first light-emitting member 210 is connected to the second light-emitting member 220 in parallel, the first light-emitting member 210 includes a first positive electrode terminal and a first negative electrode terminal, the second light-emitting member 220 includes a second positive electrode terminal and a second negative electrode terminal, the first positive electrode terminal is electrically connected to the second negative electrode terminal, and the first negative electrode terminal is electrically connected to the second positive electrode terminal; and a conducting wire 300, where a part of the conducting wire 300 is arranged in the lamp housing 100 and hermetically connected to the lamp housing 100, the first light-emitting member 210 and the second light-emitting member 220 are both fixed on the conducting wire 300, and the first light-emitting member 210 and the second light-emitting member 220 are both electrically connected to the conducting wire 300. The first light-emitting member 210 and the second light-emitting member 220 are both SMD LED. It should be noted that, in this embodiment, at least two conducting wires 300 are provided, and the two conducting wires 300 are respectively connected to a power supply.

A Christmas lamp bulb is often used outdoors, and in the case of raining, rain water may adhere to the conducting wire 300 of the lamp bulb. When the lamp bulb is powered on, the conducting wire 300 may have an oxidation reaction with the water, so as to electrolyze moisture, and at the same time the conducting wire 300 is consumed. By electrically connecting the first positive electrode terminal to the second negative electrode terminal, and electrically connecting the first negative electrode terminal to the second positive electrode terminal, when an alternating current power supply is connected, the first light-emitting member 210 and the second light-emitting member 220 will light up at the same time, and a direction of a current on the conducting wire 300 will change continuously, resulting in that a flow direction of an electron on the conducting wire 300 will change continuously, and the oxidation reaction and the reduction reaction are continuously carried out on the conducting wire 300. The oxidation reaction and the reduction reaction are carried out in a crossed manner, which avoids a single current direction on the conducting wire 300 after being powered on, resulting in that only one of two conducting wires 300 has the oxidation reaction, thereby reducing the loss of the conducting wire 300 caused by the long-term oxidation reaction, avoiding the conducting wire 300 from being broken, and prolonging the service life of the lamp bulb.

Outer surfaces of the first light-emitting member and the second light-emitting member are both wrapped with protective glue, a joint between the first light-emitting member and the conducting wire is wrapped with the protective glue, and a joint between the second light-emitting member and the conducting wire is wrapped with the protective glue.

It can be understood that, the conducting wire 300 includes an internal wire 310 and an external wire 320, the internal wire 310 is electrically connected to the external wire 320, the internal wire 310 is arranged inside the lamp housing 100 and hermetically connected to the lamp housing 100, and the external wire 320 is arranged outside the lamp housing 100. The internal wire 310 is arranged inside the lamp housing 100, the internal wire is connected to the first light-emitting member 210 and the second light-emitting member 220 in parallel, and the external wire 320 is arranged outside the lamp housing 100 for connecting an external power supply.

It can be understood that the lamp housing 100 is columnar. Two ends of the lamp housing 100 are provided with openings. After the first light-emitting member 210 and the second light-emitting member 220 are fixed on the conducting wire 300, the first light-emitting member 210 and the second light-emitting member 220 are inserted into the lamp housing 100. Apart of the conducting wire 300 inserted into the lamp housing 100 forms the internal wire 310, and a part of the conducting wire 300 left outside the lamp housing 100 forms the external wire 320. Glass is softened by heating the glass to 600° C., and then the two ends of the lamp housing 100 are sealed. Alternatively, the inserting ends of the conducting wire 300 and the lamp housing 100 are sealed first, and then the other ends are sealed. Compared with a conventional lamp bulb having a wick separately inserted into the lamp housing, the lamp housing 100 and the conducting wire 300 are integrally molded after the lamp housing 100 made of glass is fused to be sealed, resulting in that the lamp bulb can prevent dust and water from entering the lamp housing 100, thus having a better sealing performance. Therefore, the lamp bulb can withstand more severe use environments, such as rainy days, thus being more widely applied.

Specifically, the internal wire 310 includes a first internal wire 311 and a second internal wire 312. The first internal wire 311, the first light-emitting member 210, the second internal wire 312 and the second light-emitting member 220 are electrically connected in sequence. The first internal wire 311 is electrically connected to the external wire 320, and the first internal wire 311 conducts electricity by contacting with the external wire 320. In addition, the first internal wire 311 and the external wire 320 are integrally formed, which can improve the strength of the conducting wire 300. In some embodiments, the first internal wire 311, the second internal wire 312 and the external wire 320 are integrally formed, the connection between the first light-emitting member 210 and the first internal wire 311 and the connection between the second light-emitting member 220 and the second internal wire 312 are realized by welding, and the first internal wire 311, the second internal wire 312 and the external wire 320 are integrally formed, which can further improve the structural strength of the conducting wire 300.

It can be understood that, the first internal wire 311 is bent, resulting in that the first light-emitting member 210 emits light obliquely upwards. Light from the first light-emitting member 210 is mostly emitted in upward and horizontal directions, and light emitted in a downward direction is reduced, which improves the brightness of the first light-emitting member 210.

The second internal wire 312 is bent, resulting in that the second light-emitting member 220 emits light obliquely upwards. Light emitted in a downward direction is reduced, and light is mostly emitted in horizontal and upward directions, which improves the brightness of the second light-emitting member 220.

It can be understood that, the conducting wire 300 is made of Dumet wire. The Dumet wire is one of basic metal conducting wires 300, and mainly used for vacuum sealing of glass and metal. The Dumet wire is composed of a copper-nickel core, a copper layer and a dense oxidation layer, and mainly used in lighting manufacturing industry and diode manufacturing industry. The light-emitting component is arranged in the lamp housing 100 through glass sealing of the Dumet wire and the lamp housing 100, and the lamp housing 100 is made of glass, thereby having a better light transmission effect and having no problem of plastic aging.

It can be understood that, outer surfaces of the first light-emitting member 210 and the second light-emitting member 220 are both wrapped with protective glue. The protective glue protects the first light-emitting member 210 and the second light-emitting member 220 from impact damage, and plays a waterproof role at the same time. The outer surfaces of the first light-emitting member 210 and the second light-emitting member 220 are both wrapped with the protective glue, a joint between the first light-emitting member 210 and the conducting wire 300 is wrapped with the protective glue, and a joint between the second light-emitting member 220 and the conducting wire 300 is wrapped with the protective glue, which avoids the conducting wire 300 from breaking contact with the first light-emitting member 210 and the second light-emitting member 220 due to an external force.

A decorative light string according to an embodiment in a second aspect of the present disclosure includes the lamp bulb in the embodiment in the first aspect of the present disclosure. By electrically connecting the first positive electrode terminal to the second negative electrode terminal, and electrically connecting the first negative electrode terminal to the second positive electrode terminal, when an alternating current power supply is connected, the first light-emitting member 210 and the second light-emitting member 220 will light up at the same time, and a direction of a current on the conducting wire 300 will change continuously, resulting in that a flow direction of an electron on the conducting wire 300 will change continuously, and the oxidation reaction and the reduction reaction are continuously carried out on the conducting wire 300. The oxidation reaction and the reduction reaction are carried out in a crossed manner, which avoids a single current direction on the conducting wire 300 after being powered on, resulting in that only one of two conducting wires 300 has the oxidation reaction, thereby reducing the loss of the conducting wire 300 caused by the long-term oxidation reaction, avoiding the conducting wire 300 from being broken, and prolonging the service life of the lamp bulb.

The embodiments of the present disclosure are described in detail with reference to the drawings above, but the present disclosure is not limited to the above embodiments, and various changes can also be made within the knowledge scope of those of ordinary skills in the art without departing from the purpose of the present disclosure.

Having thus described the invention, what is claimed as new and desired to be secured by Letters Patent is:

1. A lamp bulb, comprising:

a lamp housing, wherein the lamp housing is a glass lamp housing;

a light-emitting component arranged in the lamp housing and comprising a first light-emitting member and a second light-emitting member, wherein the first light-emitting member is connected to the second light-emitting member in parallel, the first light-emitting member comprising a first positive electrode terminal and a first negative electrode terminal, the second light-emitting member comprises a second positive electrode terminal and a second negative electrode terminal, the first positive electrode terminal is electrically connected to the second negative electrode terminal, and the first negative electrode terminal is electrically connected to the second positive electrode terminal; and a conducting wire, wherein a part of the conducting wire is arranged in the lamp housing and hermetically connected to the lamp housing, and the first light-emitting member and the second light-emitting member are both electrically connected to the conducting wire;

wherein the conducting wire comprises an internal wire and an external wire, the internal wire is electrically connected to the external wire, the internal wire is arranged inside the lamp housing and hermetically connected to the lamp housing, and the external wire is arranged outside the lamp housing, the internal wire comprises a first internal wire arranged in a first internal wire section and a second internal wire arranged in a second internal wire section, and wherein the first internal wire, the first light-emitting member, the second internal wire and the second light-emitting member are electrically connected in sequence, and the first internal wire is bent, resulting in that the first light-emitting member arranged in the first internal wire section emits light obliquely upwards, and the second internal wire arranged in the second internal wire section is bent, resulting in that the second light-emitting member emits light obliquely upwards.

2. The lamp bulb according to claim 1, wherein the conducting wire is made of Dumet wire.

3. The lamp bulb according to claim 1, wherein the first light-emitting member and the second light-emitting member are both Surface Mounted Devices LED.

4. The lamp bulb according to claim 1, wherein the lamp housing is columnar.

5. The lamp bulb according to claim 1, wherein outer surfaces of the first light-emitting member and the second light-emitting member are both wrapped with protective glue.

6. A decorative light string, comprising the lamp bulb according to claim 1.

* * * * *